V. AÜFENAST.
DINNER PAIL HEATER.
APPLICATION FILED MAY 13, 1912.
1,051,186.
Patented Jan. 21, 1913.
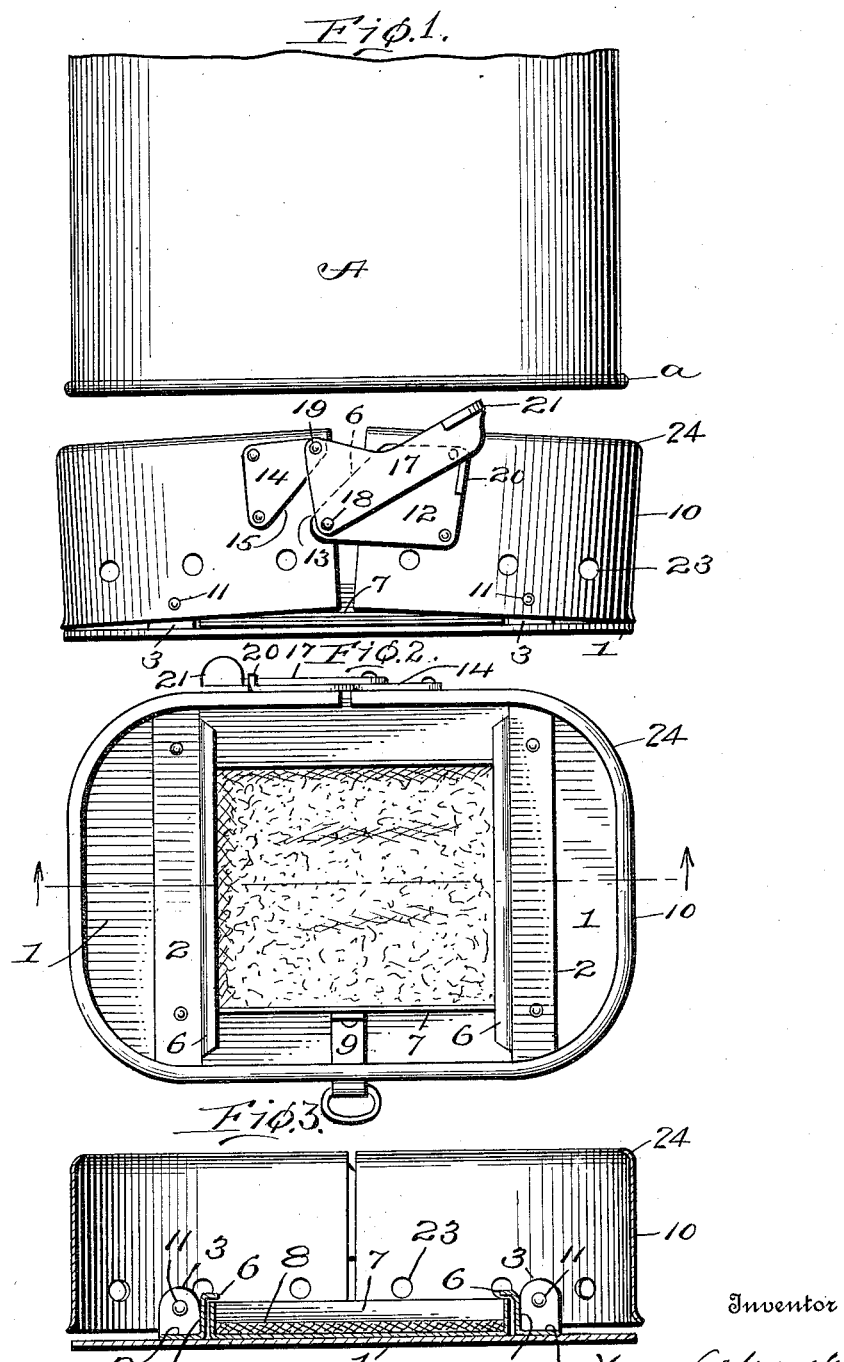

UNITED STATES PATENT OFFICE.

VERONA AÜFENAST, OF ST. PAUL, MINNESOTA.

DINNER-PAIL HEATER.

1,051,186.  Specification of Letters Patent.  Patented Jan. 21, 1913.

Application filed May 13, 1912. Serial No. 697,088.

*To all whom it may concern:*

Be it known that I, VERONA AÜFENAST, a citizen of the United States, residing at St. Paul, in the county of Ramsey and State of Minnesota, have invented certain new and useful Improvements in Dinner-Pail Heaters, of which the following is a specification.

My invention relates to devices for heating dinner pails, and has for its object the provision of a casing adapted to be secured to the bottom of the dinner pail and having means to secure the casing to the lower portion of the pail.

Another object of my invention is the provision of means for supplying heat to the bottom of the pail, consisting of a vapor lamp that is removably mounted in said casing and held in position by upstanding flanges secured to the bottom of the casing.

My invention will be described in detail hereinafter and illustrated in the accompanying drawings, in which—

Figure 1 is a similar view showing the casing removed; Fig. 2 is a top plan view of the casing, and Fig. 3 is a longitudinal sectional view of the casing.

In the drawings similar reference characters will be used to designate corresponding parts throughout the several views.

A indicates a dinner pail of the usual type, made of sheet metal and having its bottom secured by a rolled bead to the side walls of the pail, the bead being indicated at $a$.

My improved dinner pail heater is adapted to be removably secured to the bottom of the pail and is provided with means for engaging the bead $a$, as will be hereinafter more fully described.

The heater consists of a bottom plate 1 of the same contour as the bottom of the dinner pail, and provided with cross strips 2 spaced apart and secured to said bottom 1, said cross strips 2 having their ends bent upwardly as shown at 3, to form ears for a purpose to be hereinafter described, and the adjacent edges thereof bent upwardly as shown at 5, and then horizontally as shown at 6, to form slide bearings for a rectangular pan 7 adapted to contain a pad 8 of asbestos or like material to be saturated with alcohol or other volatile inflammable liquid, to form a heater for the dinner pail.

9 indicates a strap or similar handle secured to one side of the pan 7 for removing and replacing the pan from the heater.

The side walls of the casing indicated at 10 consist of a strip of sheet metal bent to conform to the contour of the bottom 1, and pivotally mounted in the ears 3 by means of rivets 11, or the like.

12 indicates a plate secured to one of the ends of strip 10 having a portion 13 projecting beyond the end of the strip and 14 indicates another plate secured to the other end of the strip, the adjacent edges of said plates being inclined as shown at 15 and 16 to prevent overlapping of said plates when the casing is secured to the pail.

17 indicates an angular lever pivotally secured at one of its angles to the end 13 of plate 12, as shown at 18, and having another angle pivotally secured to plate 14, as shown at 19.

20 indicates a projection on plate 12 that engages lever 17 to hold it in a locked position, and 21 a laterally extending flange on the end of said lever 17 to be engaged by the thumb or finger when moving said lever into or out of engagement with said projection 20.

22 indicates an opening in the lower edge of the strip of metal 10 through which the pan 7 is removed and replaced in the heater.

23 indicates holes in the strip of metal 10 comprising the side walls of the heater casing to supply air to the interior of the casing.

The upper edge of strip 10 is formed with an inturned flange 24 to engage the bead $a$ formed by the seam that holds the bottom of the pail A to its side walls.

In use my improved heater is secured to the bottom of a dinner pail such as indicated at A, by moving the free end of the lever 17 from engagement with projection 20, and swinging it upwardly to spread the flanged upper edge of the strip 10, said spreading movement being permitted by the pivotal connection between ears 3 and said strip 10, as heretofore described. The casing is then placed on the bottom of the pail and the free edge of the lever moved downwardly until its upper edge is engaged by the projection 20 when the flanged edge 24 of the strip 10 will engage the bead $a$ and hold the heater casing on the bottom of the pail. The pad 8 on the pan 7 then being saturated with an inflammable liquid such as described, and ignited, may be inserted through the opening 22 into engagement with the slide bearings formed by the flanges 5 and 6, the heater being supplied with air through the holes 23 and the opening between the bottom edge of the strip 10 and the base of the casing 1.

Having thus described my invention, what I claim is:

In a dinner pail heater, in combination with a dinner pail, a base plate, strips secured transversely of said base plate, the ends of said strips turned upwardly to form ears, a strip of metal forming the side walls of the heater casing pivotally secured to said ears, the ends of said strip of metal being spaced apart, and means secured to said spaced apart ends of the strip to expand and contract the upper edge of said strip of metal in securing the heater to the bottom of the dinner pail.

In testimony whereof I affix my signature in presence of two witnesses.

VERONA AÜFENAST.

Witnesses:
BERTHA KNYPHAUSEN,
A. J. MUELLER.

Copies of this patent may be obtained for five cents each, by addressing the "Commissioner of Patents, Washington, D. C."